(12) United States Patent
Zolotarev et al.

(10) Patent No.: US 7,503,108 B2
(45) Date of Patent: Mar. 17, 2009

(54) MULTI-SPINDLE POSITIONING APPARATUS

(75) Inventors: Isaac Zolotarev, Farmington Hills, MI (US); Richard Lorenz, Plymouth, MI (US); Al Marrocco, Windsor (CA); Lou LaPlante, Windsor (CA)

(73) Assignee: Ford Motor Company, Dearborn, MI (US)

( * ) Notice: Subject to any disclaimer, the term of this patent is extended or adjusted under 35 U.S.C. 154(b) by 453 days.

(21) Appl. No.: 10/710,282

(22) Filed: Jun. 30, 2004

(65) Prior Publication Data

US 2005/0005412 A1    Jan. 13, 2005

Related U.S. Application Data

(60) Provisional application No. 60/485,822, filed on Jul. 9, 2003.

(51) Int. Cl.
*B23P 19/00* (2006.01)
*B23Q 17/00* (2006.01)

(52) U.S. Cl. ..................... 29/757; 29/407.02

(58) Field of Classification Search ............. 29/407.02, 29/407.01, 407.09, 701, 707, 709, 714, 757; 81/467; 408/45, 16; 451/195
See application file for complete search history.

(56) References Cited

U.S. PATENT DOCUMENTS

| | | | | |
|---|---|---|---|---|
| 3,290,966 A | * | 12/1966 | Gesko | 408/16 |
| 3,822,958 A | * | 7/1974 | Lewis | 408/46 |
| 3,828,479 A | * | 8/1974 | Highberg et al. | 451/195 |
| 4,678,378 A | * | 7/1987 | Koczarski | 408/46 |
| 4,741,078 A | | 5/1988 | Kimura | |
| 5,205,805 A | * | 4/1993 | Otani et al. | 483/9 |

FOREIGN PATENT DOCUMENTS

| | | | |
|---|---|---|---|
| EP | 0232018 | * | 8/1987 |
| JP | 404240037 | * | 8/1992 |

OTHER PUBLICATIONS

Robots for Flexible Torquing, www.assemblymag.com Apr. 2002, pp. 38-40.

* cited by examiner

*Primary Examiner*—John C Hong
(74) *Attorney, Agent, or Firm*—Raymond L. Coppiellie; Brooks Kushman P.C.

(57) ABSTRACT

A spindle positioning apparatus for a robotic manipulator. The spindle positioning apparatus includes a mounting plate assembly, first and second spindles, and an actuator mechanism. The first spindle is disposed on the mounting plate assembly in a fixed position. The second spindle is disposed on the mounting plate assembly and is movable with respect to the first spindle. The actuator mechanism is adapted to move the second spindle with respect to the first spindle.

14 Claims, 2 Drawing Sheets

US 7,503,108 B2

MULTI-SPINDLE POSITIONING APPARATUS

CROSS REFERENCE TO RELATED APPLICATIONS

This application claims the benefit of U.S. provisional application Ser. No. 60/485,822 filed Jul. 9, 2003.

BACKGROUND OF INVENTION

1. Field of the Invention

The present invention relates to a spindle positioning apparatus for a robotic manipulator, such as a multi-axis robot.

2. Background Art

Previously, a single spindle was associated with a robot for engaging a fastener, such as that in U.S. Pat. No. 4,741,078.

SUMMARY OF INVENTION

According to one aspect of the present invention, a spindle positioning apparatus for a robotic manipulator is provided. The spindle positioning apparatus includes a mounting plate assembly, a first spindle, a second spindle, and an actuator mechanism. The mounting plate assembly is attached to the robotic manipulator. The first spindle is disposed on the mounting plate assembly in a fixed position. The second spindle is disposed on the mounting plate assembly and is movable with respect to the first spindle. The actuator mechanism is adapted to position the second spindle with respect to the first spindle.

The mounting plate assembly may include a fixed plate and a movable plate. The fixed plate may be adapted to receive the first spindle and may be disposed proximate the robotic manipulator. The movable plate may be adapted to receive the second spindle and may be movably attached to the fixed plate.

The first spindle may extend through the fixed plate. The second spindle may extend through the movable plate.

The actuator mechanism may be disposed proximate the mounting plate assembly. The actuator mechanism may include a ball screw assembly and a servo motor. The ball screw assembly may include a ball nut and a ball screw. The servo motor may be adapted to rotate the ball screw to actuate the ball nut. The ball nut may be attached to the movable plate. The ball screw may be attached to the fixed plate.

The first spindle may be adapted to rotate about a first axis of rotation. The second spindle may be adapted to rotate about a second axis of rotation. The first and second axes of rotation may be disposed parallel to each other. The distance between the first and second axes of rotation may be in the range of 75 mm to 1400 mm.

According to another aspect of the present invention, a multi-spindle positioning assembly is provided. The assembly includes a multi-axis robot having a manipulator arm and a spindle positioning apparatus. The spindle positioning apparatus includes first and second mounting plates, first and second spindles, and an actuator. The first mounting plate is attached to the manipulator arm and includes a first opening. The second mounting plate is movably attached to the first mounting plate and includes a second opening. The first spindle extends through the first opening and is attached to the first mounting plate. The second spindle extends through the second opening and is attached to the second mounting plate. The actuator mechanism is adapted to position the second spindle with respect to the first spindle.

The assembly may include a track disposed proximate the first mounting plate and adapted to movably receive the second mounting plate. The first and second spindles may include first and second tools, respectively, that are adapted to engage a threaded part.

According to another aspect of the present invention, a method for applying torque to a set of threaded parts with a spindle positioning apparatus is provided. The spindle positioning apparatus is disposed on a robotic manipulator and includes first and second spindle assemblies each adapted to engage a threaded part. The first and second spindle assemblies have first and second axes of rotation, respectively. The second spindle assembly is movable with respect to the first spindle assembly.

The method includes selecting a subset of the set of threaded parts, determining a center line distance between the threaded parts in the subset, moving the second spindle assembly such that the first and second axes of rotation are separated by an amount equal to the center line distance, positioning the spindle positioning apparatus with the robotic manipulator such that the first and second spindle assemblies are disposed proximate the subset of threaded parts, rotating the first and second spindle assemblies to apply torque to the subset of threaded parts, and repeating the selecting step for additional subsets of threaded parts until all of the threaded parts in the set are selected.

A first subset of the set of threaded parts may be disposed proximate a center of a workpiece. At least one part in the subset of threaded parts for a current iteration may be spaced further from the center of the workpiece than a part in the subset of threaded parts selected for a prior iteration. A last subset of the set of threaded parts may include a part disposed furthest from the center of the workpiece.

DETAILED DESCRIPTION

Figure 1:
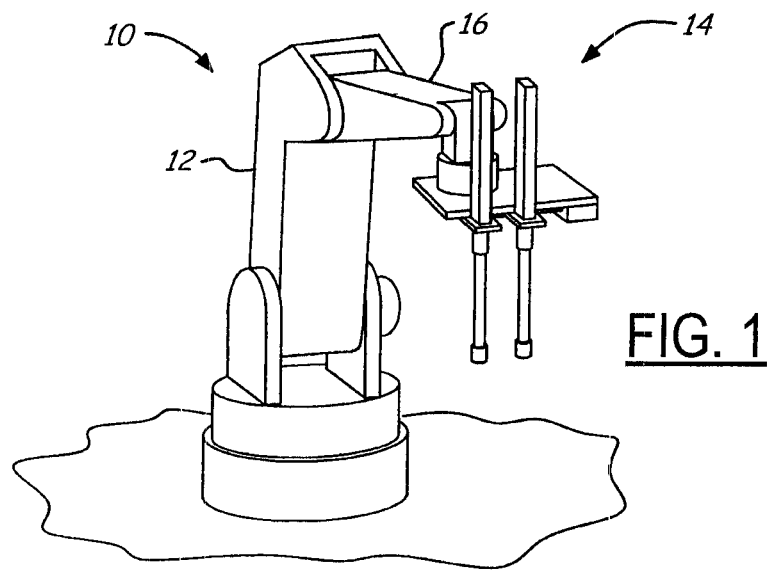
FIG. 1 is a perspective view of a multi-spindle positioning assembly having a robotic manipulator and a spindle positioning apparatus.

Referring to FIG. 1, a multi-spindle positioning assembly 10 is shown. The multi-spindle positioning assembly 10 includes a manipulator 12 and a spindle positioning apparatus 14 adapted to be attached to the manipulator 12.

The manipulator 12 may have any suitable configuration. In the embodiment shown in FIG. 1, the manipulator 12 is configured as a multi-axis robot having a manipulator arm 16. For example, the manipulator 12 may be a six-axis articulated robot, model IRB4400, made by ABB. However, the manipulator 12 may be of any suitable type and may have any suitable number of movement axes and/or degrees of freedom.

Figure 2:
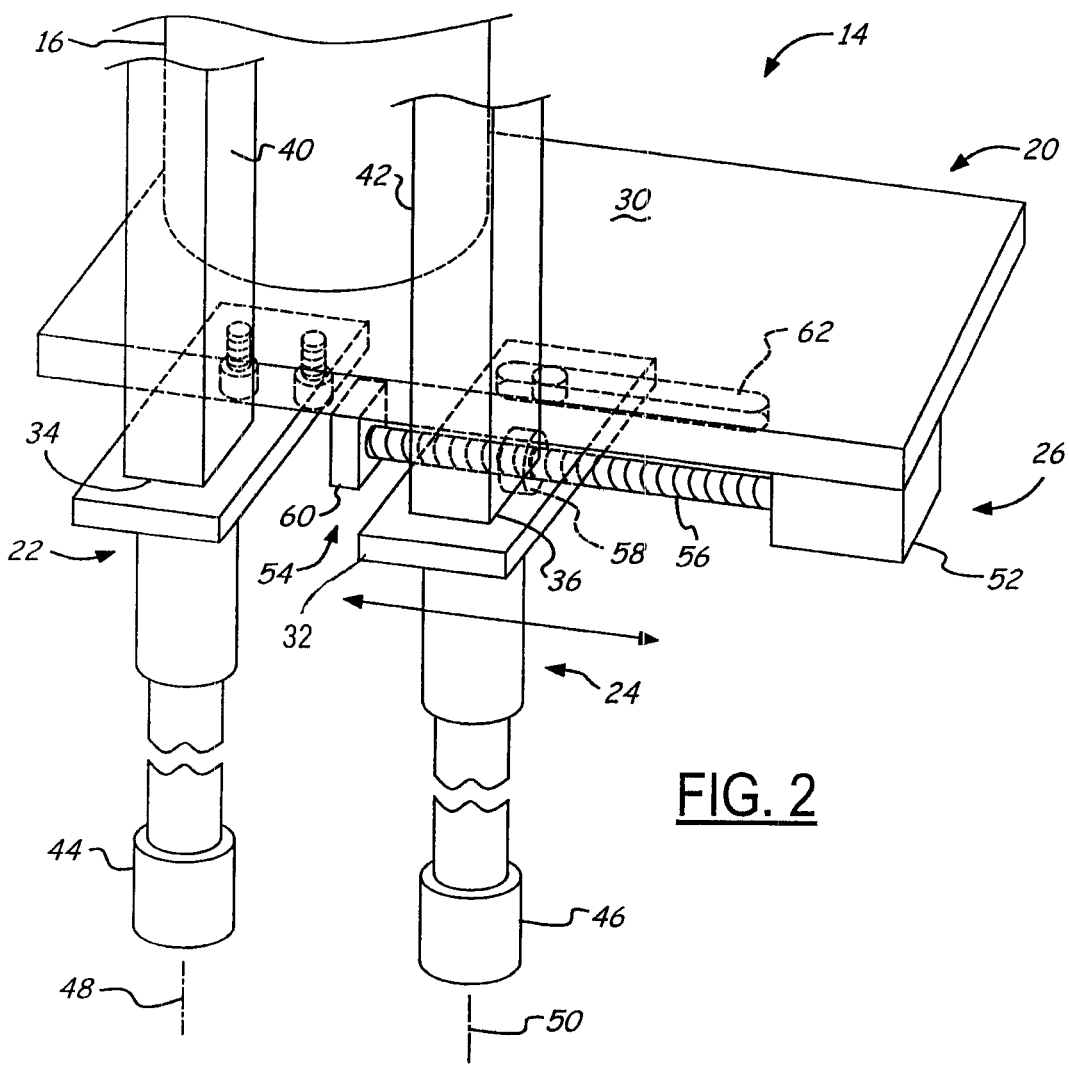
FIG. 2 is a perspective view of the spindle positioning apparatus.

Referring to FIG. 2, the spindle positioning apparatus 14 is shown in more detail. The spindle positioning apparatus 14 may include a mounting plate assembly 20, a "fixed" or first spindle assembly 22, a "movable" or second spindle assembly 24, and an actuator mechanism 26.

The mounting plate assembly 20 is adapted to receive the first and second spindle assemblies 22,24 and to allow the first spindle assembly 22 to move with respect to the second spindle assembly 24. In the embodiment shown in FIG. 2, the mounting plate assembly 20 includes a fixed plate 30 and a movable plate 32. The fixed and movable plates 30,32 may be made of any material of suitable stiffness and strength to support and/or maintain alignment of the spindle assemblies 22,24.

The fixed plate 30 may be attached to the manipulator arm 16 in any suitable manner, such as with one or more fasteners. In addition, the fixed plate 30 is adapted to receive the first spindle assembly 22. More specifically, the fixed plate 30 may include a first opening 34 for receiving the first spindle assembly 22. The first spindle assembly 22 may be attached to the fixed plate 30 in any suitable manner, such as with one or more fasteners. The fixed plate 30 may have any suitable configuration. In the embodiment shown in FIG. 2, the fixed plate 30 is generally planar. In addition, the fixed plate 30 may be made of any suitable material, such as a polymeric material or a metal.

The movable plate 32 is adapted to receive the second spindle assembly 24 and is movably attached to the fixed plate 30. More particularly, the movable plate 32 includes a second opening 36 adapted to receive the second spindle assembly 24. The second spindle assembly 24 may be attached to the movable plate 32 in any suitable manner, such as with one or more fasteners.

The first and second spindle assemblies 22,24 include a spindle 40,42 and a tool portion 44,46, respectively.

The first and second spindles 40,42 are adapted to rotate about first and second axes of rotation, 48,50 respectively. The first and second spindles 40,42 may be of any suitable type, such as bidirectional DC spindles made by Atlas Copco. Alternately, the spindles 40,42 may be configured as nutrunners or electric motors. In addition, the first and second spindles 40,42 may be driven in any suitable manner, such as with a motor or pneumatics.

The tool portions 44,46 may be disposed at a distal end of each spindle 40,42. The tool portions 44,46 may be adapted to engage a threaded part, such as a threaded fastener. The tool portions 44,46 may have any suitable configuration and may be of any suitable type. For example, the tool portions 44,46 may be configured as sockets that have an opening adapted to engage the threaded part. Moreover, the tool portions 44,46 may have a male or female configuration and may include such geometries as slotted, Phillips, pozidriv, square, triwing, TORX®, hex, spanner, penta-drive, quadrex, spline, tri-groove, triangular, or oval.

The actuator mechanism 26 is adapted to position the second spindle assembly 24 with respect to the first spindle assembly 22. More specifically, the actuator mechanism 26 is adapted to move and support the movable plate 32 with respect to the fixed plate 30. The actuator mechanism 26 may have any suitable configuration, such as a linear slide or linear motion component. In the embodiment shown in FIG. 2, the actuator mechanism 26 includes a servo motor 52 and a ball screw assembly 54. Operation of the actuator mechanism 26 may be controlled by a control unit adapted to monitor and/or control the manipulator 12. As such, the movable plate 32 may act as an additional movement axis or degree of freedom for the manipulator 12.

The servo motor 52 may be disposed proximate the fixed plate 30 and may be adapted to rotate the ball screw assembly 54 in response to an input signal from a control unit.

The ball screw assembly 54 may have any suitable configuration. In the embodiment shown in FIG. 2, the ball screw assembly 54 includes a ball screw 56 and ball nut 58.

The ball screw 56 may be connected at a first end to the servo motor 52 and at a second end to the fixed plate 30. For example, the second end of the ball screw 56 may be attached to a flange 60 disposed on the fixed plate 30. The ball screw 56 may have any suitable length to provide a desired range of spindle travel. For example, a ball screw 56 may be selected such that the distance between the first and second axes of rotation 48,50 may be in the range of 75 mm to 1400 mm.

The ball nut 58 is movably associated with the ball screw 56 and may be attached to the movable plate 32. More specifically, the ball nut 58 is disposed on the bottom of the movable plate 32 and travels along the ball screw 56 when the ball screw 56 is rotated by the servo motor 52.

Optionally, additional features may be incorporated to movably couple the fixed and movable plates 30,32 and to help guide and support the movable plate 32. For example, the movable plate 32 may be adapted to slide in a groove or track 62 disposed in/on the fixed plate 30. In addition, the fixed plate 30 and/or movable plate 32 may include one or more rotatable members, such as rollers or gears, that are received by a surface, track, or groove disposed in an opposing plate.

Figure 3:
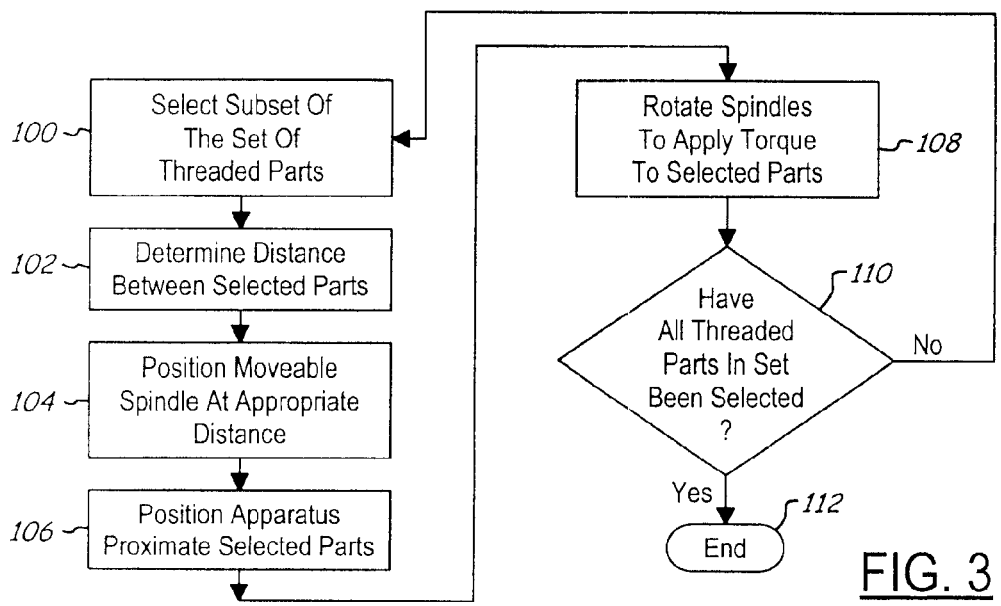
FIG. 3 is a method for applying torque to a set of threaded parts with the spindle positioning apparatus.

Referring to FIG. 3, a flowchart of a method for applying torque to a set of threaded parts associated with a workpiece will now be described. More specifically, the method employs the multi-spindle positioning assembly 10 to provide torque to one or more threaded parts, such as spark plugs or threaded fasteners like bolts.

As will be appreciated by one of ordinary skill in the art, the flowchart represents control logic which may be implemented using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing is employed in real-time control applications, rather than a purely sequential strategy as illustrated. Likewise, pair processing, multitasking, or multi-threaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

For clarity, the method is described with reference to the workpiece and set of threaded parts shown in FIG. 4A. However, it will be understood that the present invention is not limited to a particular workpiece or type of threaded part.

Figure 4A:
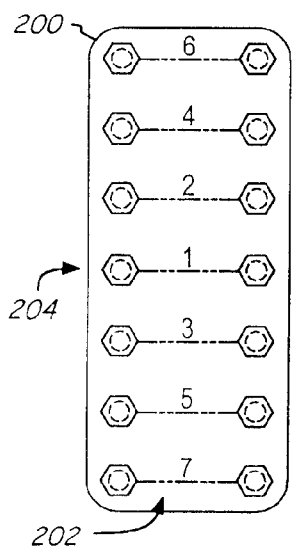
FIGS. 4A-4C are plots of different patterns for applying torque to the set of threaded parts in accordance with the method of FIG. 3.

FIG. 4A depicts a workpiece 200 configured as a cam cover for an internal combustion engine. The workpiece 200 has a plurality of apertures 202 shown in phantom adapted to receive a threaded part, such as a bolt. The threaded parts 204 comprise a set. The center line distance between any two apertures or threaded parts may vary in accordance with the configuration of the workpiece 200.

Referring to FIG. 3, at 100, the method begins by selecting a subset of a set of threaded parts. The size of the set may be equal to the total number of threaded parts. The number of members in the subset may be equal to the total number of spindles. For example, in FIG. 4A, the set includes fourteen (14) fasteners and the subset size is two (2). Moreover, in this example, the first subset selected is designated by horizontal line 1.

At 102, a distance between the center lines, or "center line distance" between the parts in the subset is determined. This distance may be determined using one or more sensors or may include preprogrammed values stored in a look up table or control logic.

At 104, the second spindle assembly 24 is positioned such that the first and second axes of rotation 48,50 are separated by a distance equal to the center line distance. The second spindle assembly 24 may be positioned using the actuator mechanism 26. For example, the servo motor 52 may be rotated a desired number of degrees to move the ball nut 58, movable plate 32, and second spindle 42 to a desired position.

At 106, the manipulator 12 positions the spindle positioning apparatus 14 such that the first and second spindle assemblies 22,24 are disposed proximate the subset of threaded parts. More specifically, the tool portions 44,46 are positioned to engage the first subset of parts.

At 108, the spindles 40,42 are rotated to apply torque to the subset of threaded parts. Torque may be provided in either the clockwise or counterclockwise direction to tighten or loosen the threaded parts.

At 110, the selecting step is repeated for additional subsets of threaded parts until all the threaded parts in the set are selected. For example, the process may continue by selecting a second subset designated by horizontal line 2 and repeating steps 102-108. The method repeats for subsets 3-7, which are designated by horizontal lines 3-7, respectively.

The method and apparatus of the present invention may be used to support a flexible manufacturing strategy. More specifically, the present invention may be used in a flexible manufacturing process for assembling workpieces having different configurations or threaded part positions. For example, the present invention may be used to assemble or "stitch" multiple fasteners to a first workpiece in a predetermined sequence, and then stitch multiple fasteners to a second workpiece having a different hole or fastener pattern on the same assembly line.

Figure 4B:
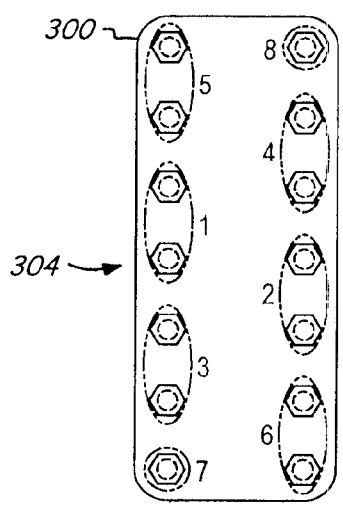
Figure 4C:
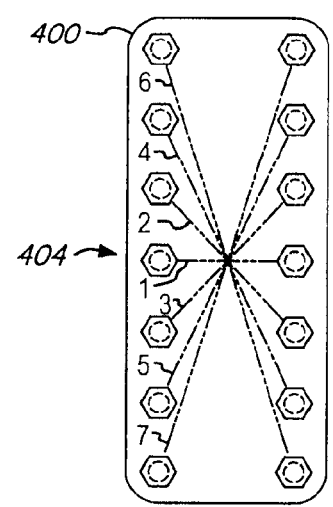

Torque patterns can be designed to improve joint quality and integrity. Referring to FIGS. 4A-4C, some representative embodiments of stitching strategies are shown. More specifically, these embodiments employ a "center-out" stitching strategy to inhibit deformation or twisting of the workpiece. In these embodiments, subsets or pairs of parts, numbered 1-7, are engaged in ascending order. These embodiments are not exhaustive of all possible patterns or stitching strategies. Consequently, it is understood that a person of ordinary skill in the art could develop different positioning patterns and strategies that incorporate one or more elements of these embodiments.

In FIG. 4A, an embodiment of a center-out stitching strategy in which the spindles are aligned to a left-to-right axis is shown. More specifically, the sequence begins with the subset (1) closest the center of the work-piece 200 and then moves outward to other subsets (2-7) located further from the center.

In FIG. 4B, an embodiment of a center-out stitching strategy in which the spindles are aligned to a top-to-bottom axis is shown. In this embodiment, the first subset selected from the set of parts 304 includes at least one fastener located closest to the center of the workpiece 300. Additional subsets 2-8 are selected so as to work outward from the center. Moreover, this embodiment shows that one or more subsets may employ a single threaded part, such as subsets 7 and 8.

In FIG. 4C, another stitching strategy embodiment is shown in which the spindles are not aligned to a particular axis. Instead, the manipulator 12 positions the spindles to engage subsets 1-7 of the set of parts 404 by adjusting the spindle spacing and rotational position with respect to the center of the workpiece 400.

The present invention reduces facilities and tooling costs as compared to dedicated fixed-position equipment since a multi-axis positioning assembly reduces or eliminates the need to invest in multiple dedicated robots for each product type. Moreover, the present invention improves process throughput and equipment utilization when multiple products are manufactured as compared to dedicated equipment.

While the best mode for carrying out the invention has been described in detail, those familiar with the art to which this invention relates will recognize various alternative designs and embodiments for practicing the invention as defined by the following claims.

The invention claimed is:

1. A spindle positioning apparatus for a robotic manipulator comprising:
    a mounting plate assembly attached to the robotic manipulator, the mounting plate assembly having a fixed plate disposed proximate the robotic manipulator and a movable plate movably attached to the fixed plate;
    a first spindle disposed on the fixed plate in a fixed position and having a first axis of rotation;
    a second spindle disposed on the movable plate and movable with respect to the first spindle, the second spindle having a second axis of rotation; and
    an actuator mechanism adapted to position the second spindle with respect to the first spindle;
    wherein the first and second axes of rotation are disposed in a common plane that does not intersect a location where the mounting plate assembly is attached to the robotic manipulator.

2. The apparatus of claim 1 wherein the mounting plate assembly includes a linear slot and the movable plate includes a pin that extends into the linear slot to help guide movement of the movable plate.

3. The apparatus of claim 1 wherein the first spindle extends through the fixed plate and the second spindle extends through the movable plate.

4. The apparatus of claim 1 wherein the actuator mechanism is disposed on a first side of the mounting plate assembly and the robotic manipulator is disposed on a second side of the mounting plate assembly disposed opposite the first side.

5. The apparatus of claim 4 wherein the actuator mechanism further comprises a ball screw assembly having a ball nut and a ball screw, and a servo motor adapted to rotate the ball screw to actuate the ball nut.

6. The apparatus of claim 5 wherein the ball nut is attached to the movable plate and the ball screw is attached to the fixed plate.

7. The apparatus of claim 1 wherein the first spindle has a first axis of rotation, the second spindle has a second axis of rotation, and a distance between the first and second axes of rotation is in the range of 75 mm to 1400 mm.

8. The apparatus of claim 1 wherein the first spindle is adapted to rotate about a first axis of rotation, the second spindle is adapted to rotate about a second axis of rotation, and the first and second axes of rotation are disposed parallel each other.

9. A spindle positioning apparatus for a robotic manipulator comprising:
    a first mounting plate assembly attached to the robotic manipulator and having a first opening;
    a second mounting plate assembly movably attached to the first mounting plate and having a second opening;

a first spindle extending through the first opening and attached to the first mounting plate assembly;

a second spindle extending through the second opening and attached to the second mounting plate assembly; and an actuator mechanism configured to position the second spindle with respect to the first spindle.

10. The apparatus of claim 9 further comprising a track disposed proximate the first mounting plate assembly and adapted to movably receive the second mounting plate assembly.

11. The apparatus of claim 9 wherein the actuator mechanism further comprises a ball screw assembly having a ball nut and a ball screw, and a servo motor adapted to rotate the ball screw to actuate the ball nut, wherein the actuator mechanism is disposed on a bottom side of the first mounting plate assembly disposed opposite the robotic manipulator.

12. The apparatus of claim 11 wherein the ball screw is attached to the first mounting plate assembly and the ball nut is attached to the second mounting plate assembly.

13. The apparatus of claim 9 wherein the first mounting plate assembly includes a fixed plate attached to the robotic manipulator and an extension plate that extends from a side of the fixed plate, wherein the first opening is provided in the extension plate.

14. The apparatus of claim 13 wherein the extension plate and the second mounting plate assembly extend from a common side of the fixed plate.

\* \* \* \* \*